United States Patent [19]

Lasaroff et al.

[11] Patent Number: 5,309,706
[45] Date of Patent: May 10, 1994

[54] SHACKLE-TYPE CONNECTOR

[75] Inventors: Christoph Lasaroff, Niederndorf; Dieter Hesse, Erlangen; Wolf Kuhlmann, Nürnberg, all of Fed. Rep. of Germany

[73] Assignee: Lukas Hydraulik GmbH, Fed. Rep. of Germany

[21] Appl. No.: 93,786

[22] Filed: Jul. 19, 1993

[30] Foreign Application Priority Data

Jul. 18, 1992 [DE] Fed. Rep. of Germany ....... 9209655

[51] Int. Cl.⁵ .................................. F16G 15/00
[52] U.S. Cl. .................................. 59/93; 59/78; 24/116 R
[58] Field of Search .................. 59/78, 85, 93; 24/116 R

[56] References Cited

U.S. PATENT DOCUMENTS

| | | | |
|---|---|---|---|
| 2,165,377 | 7/1939 | Henery | 59/93 |
| 3,521,443 | 7/1970 | Dragonuk | 59/93 |
| 3,729,926 | 5/1973 | Buske | 59/93 |
| 4,176,874 | 12/1979 | Archer | 59/93 |
| 4,241,575 | 12/1980 | St Germain | 59/93 |
| 4,247,966 | 2/1981 | Labbe | 59/93 |

FOREIGN PATENT DOCUMENTS

| | | | |
|---|---|---|---|
| 0071566 | 2/1983 | European Pat. Off. | 59/93 |
| 0061972 | 6/1925 | Sweden | 59/93 |

*Primary Examiner*—David Jones
*Attorney, Agent, or Firm*—Ostrolenk, Faber, Gerb & Soffen

[57] ABSTRACT

A shackle-type connector for the rapid attachment of a round-linked chain to an external device, such as hydraulic rescue equipment. The connector includes a body having an attachment opening which is capable of removably receiving the device, to attach the connector thereon. The chain can be extended through a chain passage hole in the body of the connector. A holding slot communicates with the hole through a transition region. A securing nose defines a chain passage channel in the transition region. The chain can be drawn through the chain passage hole, and a link of the chain is then slid over the securing nose, through the chain passage channel and into the holding slot, whereby the surrounding links, which are rotated with respect to the link in the holding slot, cannot slide into the holding slot. Thus the securing nose secures the chain in the connector.

10 Claims, 1 Drawing Sheet

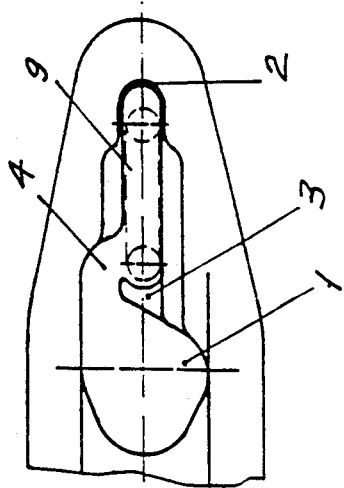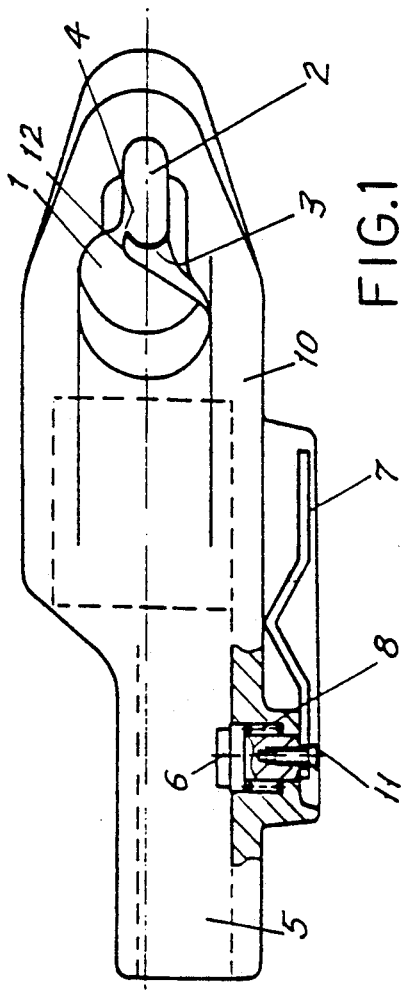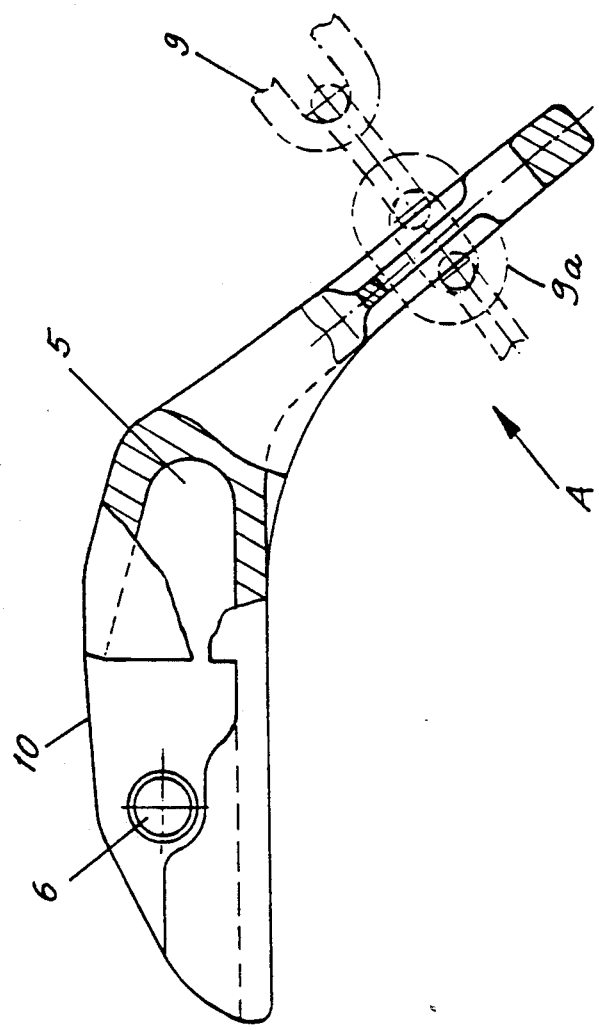

5,309,706

SHACKLE-TYPE CONNECTOR

BACKGROUND OF THE INVENTION

1. Field of the Invention

The present invention relates to a shackle-type connector which can be rapidly attached to round-link chains for connection to an external device, such as a piece of hydraulic rescue equipment.

2. Description of the Related Art

It is known, especial y for the transport of cargo, to use a shortening strap in which a round-steel link chain is inserted through a chain passage hole and can be fixed by being inserted into a narrow holding slot. See Erlau AG of Aalen, company brochure DIB/773/d 0890/5 which describes the VLS shortening strap. However, with this type of connector there is a disadvantage that, under unfavorable conditions, the chain can slip out of the holding slot and detach itself.

When chains are used with hydraulic rescue equipment, which is used for rescuing persons who are trapped in vehicles involved in accidents (for example, see Applicant's "LUKAS Rescue System" company brochure HR 41 221 OE), unintentional detachment of the chain could be fatal.

SUMMARY OF THE INVENTION

The present invention overcomes the deficiencies of the prior art by providing a shackle-type connector which can rapidly and dependably attach a round-steel link chain to an external device, such as a rescue equipment, by simple means, and reliably avoid unintended detachment thereof.

The shackle-type connector comprises a body. The body has means for removably attaching the connector to the device. Securing means is also provided for securing the chain to the connector. The securing means includes a chain passage hole and a holding slot communicating with the chain passage hole through a transition region. A securing nose is arranged in the transition region. The chain is drawn through the chain passage hole and slid over the securing nose into the holding slot.

The securing nose is approximately tangential to the chain passage hole and transverse to the holding slot. The holding nose defines a chain passage channel in the transition region. The securing nose extends towards the chain passage channel from one side toward the opposite side of the holding slot.

The attachment means comprises an attachment opening in the body and at least one stop pin which extends into the opening. The device can be inserted through the opening, and the stop pin will engage the device to secure the connector thereon. A spring biases the stop pin against the device and a lever is provided for retracting the stop pin, against the force of the spring.

Other features and advantages of the present invention will become apparent from the following description of the invention which refers to the accompanying drawings.

BRIEF DESCRIPTION OF THE DRAWINGS

FIG. 1 shows a front view of the shackle-type connector in accordance with an embodiment of the invention.

FIG. 2 is a top view of the shackle type connector.

FIG. 3 illustrates the chain passage hole and holding slot, as seen in the direction of the arrow A in FIG. 2.

DETAILED DESCRIPTION OF AN EMBODIMENT OF THE INVENTION

Referring to FIGS. 1 and 2, the body 10 of the connector includes a chain passage hole designated by reference numeral 1. Chain passage hole 1 communicates with a holding slot 2. A securing nose 3, which prevents the unintended detachment of the chain 9, is arranged in a transition region 12 between hole 1 and slot 2. As shown in FIGS. 1 and 3, the securing nose 3, which extends approximately tangential to the chain passage hole 1 and transverse to the holding slot 2, extends upward to, or near, an imaginary extension of the opposite wall of slot 2. An open chain passage channel 4 for a link of chain 9 is defined in transition region 12 by the nose 3.

The shackle-type connector can be placed on, for example, the tip or an arm of a hydraulic rescue device (not shown). As shown in FIG. 2, the body 10 of the connector includes an attachment opening 5 through which a portion of the rescue device can be inserted. For example, an arm of the rescue device (not shown) can pass through opening 5. In the region of opening 5 there is provided at least one stop pin 6 which extends into the attachment opening 5 and can be retracted by a lever 7 against the force of a spring 8, see FIG. 1. Lever 7 is attached to stop pin 6 by a fastener 11. The shackle-type connector can thus be fastened to and removed from the rescue equipment or another object, rapidly and reliably.

In the event of a rescue, after the shackle-type connector has been placed on an arm of the rescue equipment, the chain 9, which initially is still loose, is passed through the chain passage hole 1 and pulled and tightened by hand. A chain link 9a is then swung around the securing nose 3 into the passage channel 4 and pushed sideways into the holding slot 2. The chain is thus fixed in position. Since the cross-sectioned shape of the holding slot closely matches that of the link 9a (as defined at one end by the securing nose), the surrounding chain links, which are rotated up to 90° with respect to the link 9a, cannot pass through the holding slot 2.

By the arrangement of the securing nose 3, in the transition region 12, between chain passage hole 1 and holding slot 2, assurance is provided that the chain 9, while under tension, cannot unintentionally slip out of the holding slot 2. Nevertheless, rapid easy attachment and detachment is assured, which is necessary in rescue equipment.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A shackle-type connector for the rapid attachment of a linked chain to an external device, comprising:
 a body;
 means in said body capable of removably attaching the connector to the external device;
 means in said body for securing the chain to the connector, said securing means comprising a chain passage hole and a holding slot communicating with said hole through a transition region; and a securing nose arranged in said transition region for defining a passage channel through which a given link of the chain can pass from said passage hole and into said holding slot, and further for blocking the exit of said link from the holding slot; said securing nose is approximately tangential to said chain passage hole and transverse to said holding slot.

2. A shackle-type connector for the rapid attachment of a linked chain to an external device, comprising:
a body;
means in said body capable of removably attaching the connector to the external device;
means in said body for securing the chain to the connector, said securing means comprising a chain passage hole and a holding slot communicating with said hole through a transition region; and
a securing nose arranged in said transition region for defining a passage channel through which a given link of the chain can pass from said passage hole and into said holding slot, and further for blocking the exit of said link from the holding slot; said securing nose extends into said transition region to define said chain passage channel, said securing nose extending from one side of said holding slot, toward an imaginary extension of another side of said holding slot.

3. The shackle-type connector of claim 2, wherein said securing nose, with said body, defines a length of said holding slot, and extends from said one side toward said other side of said holding slot over a distance which is approximately equal to a width of said holding slot.

4. The shackle-type connector of claim 3, wherein said length and width of said holding slot are approximately equal to cross-sectional dimensions of a link of the chain, so that links adjacent to said given link cannot enter said holding slot when said given link is in said holding slot.

5. The shackle-type connector of claim 2, wherein said chain passage channel is approximately tangential to said chain passage hole.

6. A shackle-type connector for the rapid attachment of a linked chain to an external device, comprising:
a body;
means in said body capable of removably attaching the connector to the external device; said means for attaching the connector to the device includes an attachment opening in said body, and at least one stop pin which extends into said attachment opening, wherein when the device is inserted into said attachment opening, said stop pin engages the device to secure the connector to the device;
means in said body for securing the chain to the connector, said securing means comprising a chain passage hole and a holding slot communicating with said hole through a transition region; and
a securing nose arranged in said transition region for defining a passage channel through which a given link of the chain can pass from said passage hole an into said holding slot, and further for blocking the exit of said link from the holding slot.

7. The shackle-type connector of claim 6, wherein said means for attaching the connector to the device includes means for biasing said stop pin toward said attachment opening.

8. The shackle-type connector of claim 7, wherein said biasing means comprises a spring.

9. The shackle-type connector of claim 7, wherein said means for attaching the connector to the device includes a lever for retracting said stop pin against the force of said biasing means.

10. The shackle-type connector of claim 9, wherein said stop pin has opposed ends and extends through said body, one end engaging the device and said other end being attached to said lever.

* * * * *